(12) United States Patent
Thebault

(10) Patent No.: US 10,464,534 B2
(45) Date of Patent: Nov. 5, 2019

(54) METHOD FOR CONTROLLING A SYSTEM FOR WIPING AND WASHING A WINDOW OF A VEHICLE AND SYSTEM USING IT

(71) Applicant: Valeo Systèmes d'Essuyage, Le Mesnil Saint Denis (FR)

(72) Inventor: Denis Thebault, Clermont Ferrand (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 397 days.

(21) Appl. No.: 15/333,419

(22) Filed: Oct. 25, 2016

(65) Prior Publication Data
US 2017/0120877 A1 May 4, 2017

(30) Foreign Application Priority Data

Nov. 3, 2015 (FR) ..................................... 15 60526

(51) Int. Cl.
| | |
|---|---|
| *B60S 1/50* | (2006.01) |
| *B60S 1/54* | (2006.01) |
| *B60S 1/52* | (2006.01) |
| *B60S 1/48* | (2006.01) |
| *B60S 1/08* | (2006.01) |
| *B60S 1/16* | (2006.01) |
| *B60S 1/38* | (2006.01) |

(52) U.S. Cl.
CPC ................. *B60S 1/524* (2013.01); *B60S 1/08* (2013.01); *B60S 1/163* (2013.01); *B60S 1/381* (2013.01); *B60S 1/3849* (2013.01); *B60S 1/3874* (2013.01); *B60S 1/482* (2013.01)

(58) Field of Classification Search
CPC ............. B60S 1/04; B60W 50/14; B05B 3/02
See application file for complete search history.

(56) References Cited

U.S. PATENT DOCUMENTS

| | | | |
|---|---|---|---|
| 2010/0037416 A1* | 2/2010 | Amagasa | .................. B60S 1/08 15/250.31 |
| 2013/0207577 A1 | 8/2013 | Natsume | |
| 2015/0113754 A1 | 4/2015 | Umeno | |
| 2016/0129888 A1* | 5/2016 | Kim | ........................ B60S 1/482 15/250.04 |

OTHER PUBLICATIONS

Preliminary Search Report issued in corresponding French Application No. 1560526, dated Aug. 22, 2016 (7 pages).

\* cited by examiner

*Primary Examiner* — Bickey Dhakal
*Assistant Examiner* — Charles S Laughlin
(74) *Attorney, Agent, or Firm* — Osha Liang LLP

(57) ABSTRACT

A method for washing a window of a vehicle, using at least one wiper blade member and a liquid projector that projects liquid for washing the window onto a wiping surface has a first wiping cycle including a first step of actuating the wiper blade member to move over the window in a first direction from a first starting position to a wiping end position, while projecting the liquid onto the wiping surface, and a second step of actuating the wiper blade member to move over the window in a second direction opposite the first direction from the wiping end position to the first starting position, and a second wiping cycle including a third step of actuating the wiper blade member to move over the window in the first direction from the first starting position to the wiping end position, while projecting the liquid onto the wiping surface.

14 Claims, 3 Drawing Sheets

Figure 1:
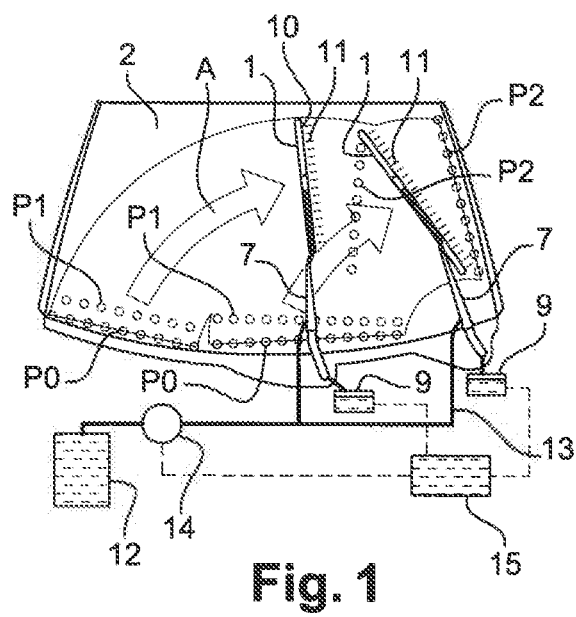

METHOD FOR CONTROLLING A SYSTEM FOR WIPING AND WASHING A WINDOW OF A VEHICLE AND SYSTEM USING IT

The present invention relates to systems for wiping and washing a window of a vehicle, in particular a motor vehicle.

A motor vehicle in particular is conventionally provided with a system for wiping the windscreen, which serves to provide the driver with a clear view of his environment, in particular in the event of bad weather. Such a system generally comprises one or two wiper blade members which are driven by an arm in a back and forth movement on the windscreen. These blade members carry wiper blades which are produced from a resilient material and which rub against the windscreen and which discharge the water by removing it from the field of vision of the driver.

It is also conventional to supplement the wiping system with washing means which are arranged to project a liquid onto the windscreen in order to facilitate the dissolution of dirt and thus to increase the quality of cleaning of the windscreen under the action of the wiping system. The cleaning means are generally actuated over one or a few back and forth movements of the blade member in order to carry out a washing cycle.

For the washing means, it is also known to fit nozzles to the blade member in order to project the liquid immediately in front of it during its movement. This enables the wiper blade of the blade member to pass over a surface which has been wetted by the washing liquid during its entire movement and thus to improve the efficiency of the washing cycle.

When the windscreen is very dirty, however, the wiper blade carries washing liquid which has been polluted by the dirt as far as its return position after it has moved back and forth. Consequently, the wiper blade touches a dirty zone at its return position after each back and forth movement. It is therefore never completely clean and spreads dirt on the surface of the windscreen over which the blade member passes. This phenomenon occurs in particular when the washing means project washing liquid only at one side of the blade member since, in this instance, one of the faces of the wiper blade is not directly cleaned by this liquid.

There is therefore a need to prevent dirt present on a window from being carried during back and forth movements of the blade member in order to improve the performance levels of the systems for wiping and cleaning a window on a vehicle.

To this end, the invention proposes a method for washing a window of a vehicle, using at least one wiper blade member and means for projecting a liquid for washing the window onto a wiping surface which is delimited between a wiping starting position and a wiping end position for the at least one wiper blade member, for controlling a system for wiping and cleaning a window of a vehicle, the system comprising a wiper blade member, means for actuating the wiper blade member and means for projecting a liquid for washing the window, the method comprising one or more wiping cycles each comprising:

a first step in which the wiper blade member is actuated in order to move over the window between a first starting position and the wiping end position, and
  a second step in which the wiper blade member is actuated in order to move over the window in an opposite direction from the wiping end position as far as a second starting position,
the first starting position of a wiping cycle corresponding to the second starting position of the preceding wiping cycle.

The method is remarkable in that it begins with a first wiping cycle whose first and second starting positions are substantially identical and are at least as far from the wiping end position as the wiping starting position and in which the projections means are actuated at least during the first step in order to project washing liquid in front of the wiper blade member relative to its movement direction, and in that it comprises, immediately afterwards, a second wiping cycle whose second starting position is offset towards the end position relative to the first starting position.

The first wiping cycle enables the window to be wetted over the entire wiping zone and thus enables the dust which is mixed with the washing liquid to be wiped over this entire zone. However, on returning to the starting position thereof, the wiper member deposits there dust which may be carried on the window during a subsequent wiping cycle. The offset between the second starting position and the first starting position of the second cycle is thus carried out so that the wiper blade member does not touch the zone of the window with which it was in contact in the first starting position when it returns to the second starting position. In this manner, if the window was dirty and the wiper blade member, during the previous back and forth movements, has carried dust then deposited it on the window when positioning itself at the first starting position, the contact of the wiper blade member with this dust is limited or even eliminated when it is in the second starting position at the end of the wiping cycle. In this manner, the wiper blade member can leave again in order to carry out a back and forth movement on the window without carrying this dust. If the method comprises other wiping cycles with actuation of the means for projecting the washing liquid, this enables the efficiency thereof to be improved. If the method is followed by wiping cycles, this prevents them from spreading dust on the window. Such a method is particularly advantageous when the means for projecting washing liquid do not send liquid from the two sides of the wiper blade member and thus clean less well the side of the wiper blade which is orientated towards the starting position.

Advantageously, the method comprises, after the second wiping cycle, at least one other wiping cycle whose second starting position is offset towards the wiping end position with respect to the first starting position thereof. As in the case above, residual dust which is left on the window during the first wiping cycle may have been carried then deposited by the wiper member during the second cycle, in the second starting position thereof. The second starting position which is offset from the third cycle prevents this dust from being touched during subsequent wiping operations. This process may optionally be repeated with additional wiping cycles, preferably actuating the cleaning device.

Preferably, the first and second starting positions of each wiping cycle are located in a predetermined zone which is close to the wiping starting position, in order to minimise a spread of dust over the wiping surface outside the predetermined zone.

The fact that the first and second starting positions remain in a zone close to the wiping starting position enables the majority of the dust to be kept in this zone outside the main portion of the wiping surface which aids the visibility of the driver. Typically, this zone corresponds to an angular deviation of the wiper member of less than a dozen degrees, for a rotational movement of the arm which carries it.

Preferably, for at least one of the wiping cycles which is carried out after the first wiping cycle, the projection means are actuated during the first step in order to project washing liquid in front of the wiper blade member relative to its movement direction. The washing which is carried out during this step enables the residual dust to be better removed by the wiper blade member.

Advantageously, for the last wiping cycle which has been carried out, the means for projecting a liquid for washing the window are actuated neither during the first step nor during the second step, the starting position of the wiping cycle corresponding to the second starting position of a washing cycle of the first type preceding it, Advantageously, the method comprises, prior to the at least one washing cycle of the first type, at least one washing cycle which is carried out before the at least one washing cycle of a second type in which the first and the second starting position are substantially identical and correspond to the first starting position of the at least one washing cycle of the first type.

In this manner, the window has been cleaned over the entire surface which has been wiped during the following cycles and the dust which is removed by the wiper blade member during this cycle is pushed into a first position which is no longer contacted by the wiper member at the end of the following cycles.

In a first embodiment of the method, the first starting position of the first wiping cycle which is carried out is substantially the same as the wiping starting position.

In a second embodiment of the method, the first starting position of the first wiping cycle which is carried out is further away from the wiping end position than the wiping starting position.

In such a method, the second step of all the wiping cycles can advantageously be carried out without actuating the means for projecting washing liquid.

Advantageously, the wiper blade member moves over the window upwards during the first step of a wiping cycle.

The invention also relates to a control device for a system for wiping and washing a window of a vehicle, the system comprising a wiper blade member, means for actuating the wiper blade member and means for projecting a liquid for washing the window, the device comprising an electronic member which is arranged in order to actuate the actuation means of the wiper blade member and the means for projecting washing liquid in order to wipe the wiping surface with the at least one wiper blade member without projecting washing liquid in order to carry out the method as described above.

The invention also relates to a system for wiping and washing a window of a vehicle, the system comprising a wiper blade member, means for actuating the wiper blade member which are arranged so that the wiper blade member moves over the window between a starting position and an end position, modifying the starting position when it returns, means for projecting a liquid for washing the window, which means are arranged to project the washing liquid in front of the wiper blade member during its movement from a starting position to the end position, and such a control device.

Preferably, the actuation means of a wiper blade member comprise a motor which can be controlled electronically and an arm for driving the wiper blade member, the motor rotatably driving the drive arm.

Advantageously, such a system is arranged so that the offset between the second starting position and the first starting position, over at least one wiping cycle, corresponds to an angular difference which is at least equal to two degrees in the rotation of the drive arm.

Preferably, the system is configured so that the wiping starting position (P1) is low relative to the wiping end position.

Advantageously, such as system is configured to carry out wiping cycles in which the wiper blade member carries out a back and forth movement between a wiping starting position and the wiping end position without the means for projecting a liquid for washing the window being actuated, and is arranged so that the wiper blade member is positioned in a parking position, when it is not used, which is further away from the wiping end position than the wiping starting position.

In this instance, the control device is preferably arranged so as to control a first wiping cycle in which the first starting position is the "parking" position.

Figure 2:
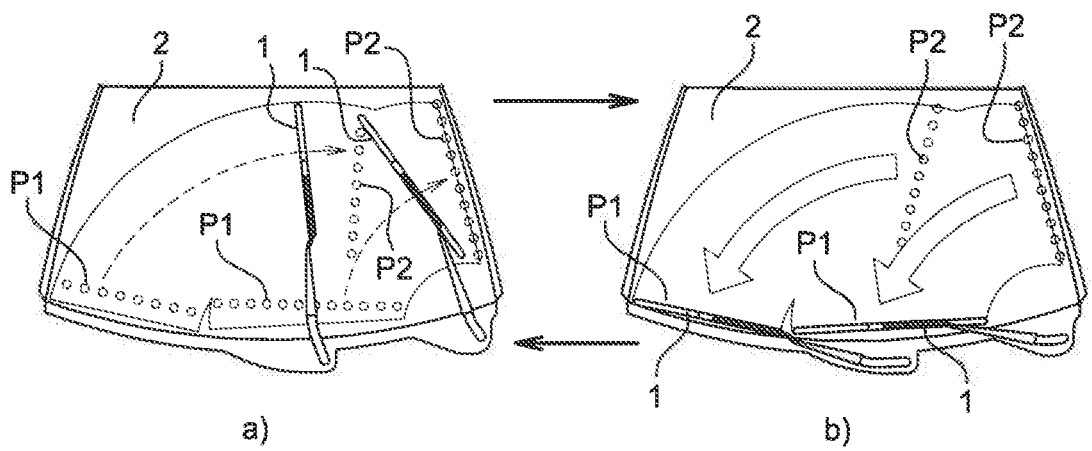
Figure 3:
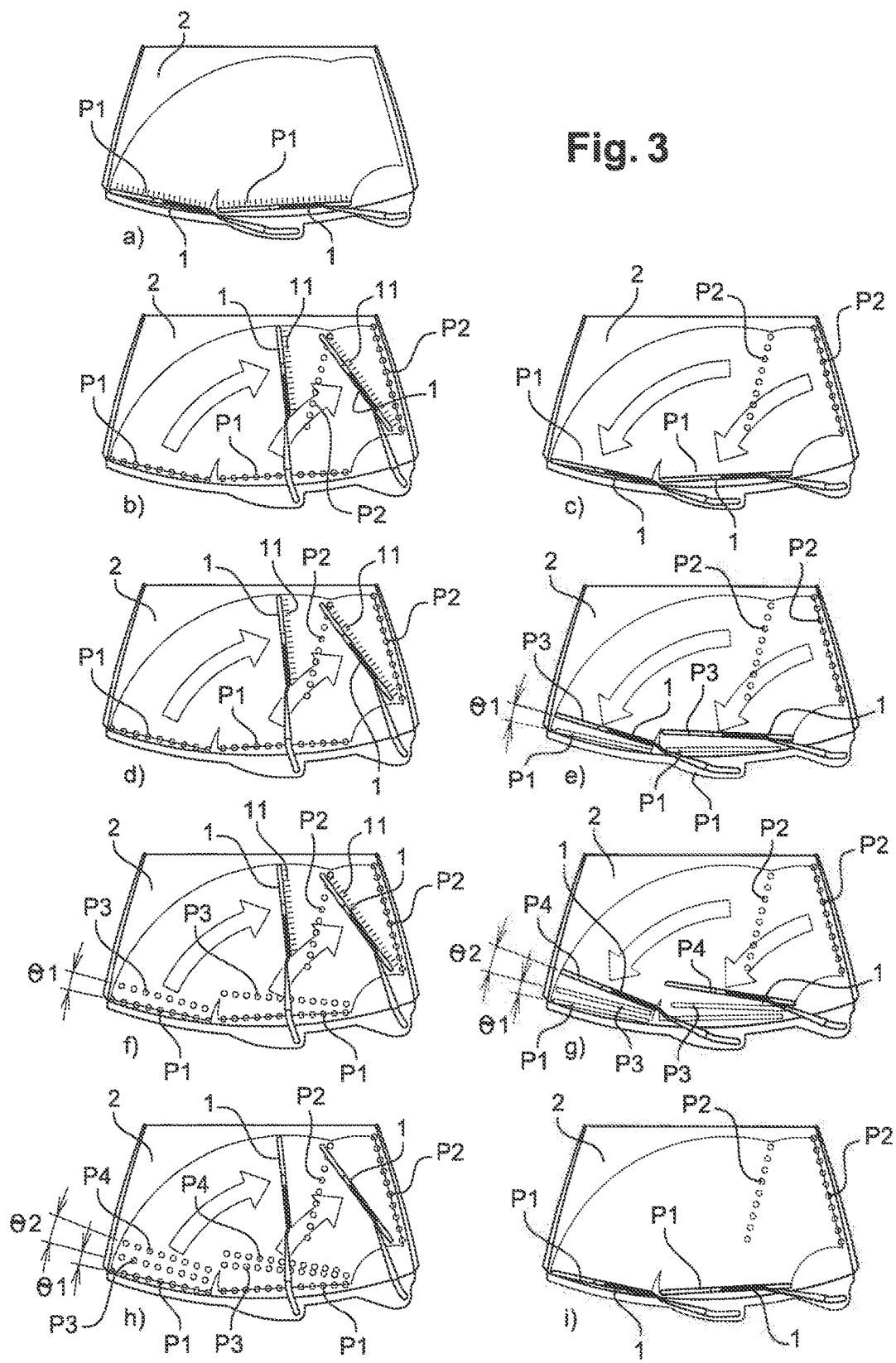
Figure 4:
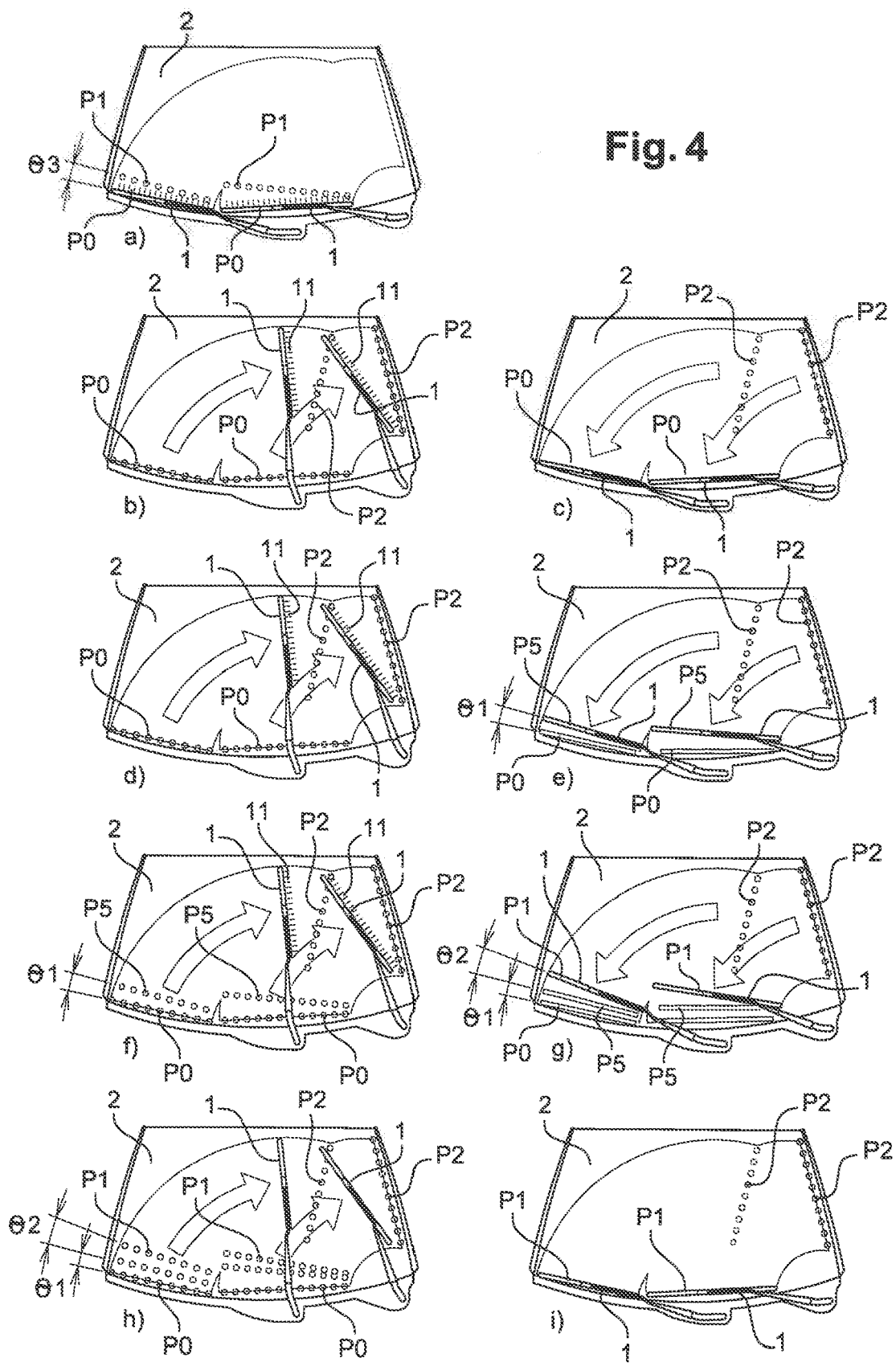

The invention will be better understood and other details, features and advantages of the invention will be appreciated from a reading of the following description given by way of non-limiting example with reference to the appended drawings in which:

FIG. 1 is a schematic view of a system for wiping and washing a vehicle window using the invention, FIG. 2 is an illustration of the steps of a wiping cycle with the system of FIG. 1, FIG. 3 is an illustration of the steps of a first embodiment of a washing method according to the invention with the system of FIG. 1, and FIG. 4 is an illustration of the steps of a second embodiment of a washing method according to the invention with the system of FIG. 1.

With reference to FIG. 1, a wiping and washing system which uses the invention comprises at least one wiper blade member 1 which, when it is mounted on the vehicle, is in abutment against an outer face of the windscreen 2. The windscreen mentioned in this instance is an example of a window which is wiped by the system according to the invention but it is self-evident that this window may be a rear window of the vehicle and generally any window pane of a vehicle. The wiping and washing system comprises two wiper blade members 1 in this instance.

The wiper blade member(s) 1 is/are generally of the flat wiper blade type (flat blade), that is to say, comprising at least one blade which is pressed against the windscreen 2, one or more reinforcement vertebrae which are connected to the blade and which extend along it, and a single central fixing which is produced by means of a mechanical connector which is connected to an end of an arm 7. Such a wiper blade member 1 may also comprise an air deflector which is fixedly joined to the wiper blade, for example, and which is arranged in order to exploit the dynamic effect of the movement of the vehicle in order to increase the pressing force of the wiper blade member 1 on the windscreen 2.

Each wiper blade member 1 is moved on the windscreen 2 of the vehicle by actuation means. These actuation means generally comprise an arm 7 to which the wiper blade member 1 is connected by the mechanical connector, and an electric motor 9 which drives the arm 7 in a back and forth movement on the surface of the windscreen 2. In this instance, the drive motor 9 of the arm 7 can be electronically controlled so that it can slide the wiper blade member 1 on the windscreen 2 at a predetermined speed between two extreme positions which may be modified between two back and forth cycles. The drive means may also comprise elements which are not illustrated in FIG. 1, such as a speed reducer, in order to adapt the rotation speed of the electric motor 9 to that desired for the wiper blade members 1, and a linkage mechanism in order to transmit the rotation movement at the output of the speed reducer.

In the example set out in FIG. 1, which generally corresponds to a tourist vehicle window 2, all the mechanism which comprises the arm 7 and the motor 9 can make the wiper blade member(s) 1 pass over a surface which is between a wiping starting position P1 which is close to the bottom of the windscreen 2, and an upper end position P2 close to the vertical. This surface corresponds to the portion of the windscreen on which the system is arranged in order to carry out the functions of wiping and washing. Generally, the wiping starting position P1 corresponds to the stop position of the wiper blade members 1 when they are not used.

In a construction variant of the wiping and washing system, the mechanism may also position the wiper blade member(s) 1 in a position P0 which is offset relative to the wiping starting position P1 and which in this instance is lower than the position P1 and located outside the surface of the windscreen 2 which is wiped for the wiping and washing functions. This position P0, called the parking position, in particular enables the wiper blade members 1 to be concealed behind a bonnet when they are not used.

With regard to the above description, an alternative configuration which is not illustrated may be envisaged for some vehicles such as lorries, in which the wiping starting position P1 is at the top whilst the end position P2 is at the bottom of the windscreen 2.

The wiping and washing system according to the invention also comprises means for projecting a liquid for washing the windscreen. These means comprise a nozzle system 10 which may be fitted to the wiper blade member 1. Generally, the system comprises a plurality of nozzles 10 which are distributed in the longitudinal direction of the wiper blade member 1 and which are arranged to project jets 11 of washing liquid towards the windscreen 2. In the example in question, the wiping and washing system comprises at least one row of nozzles 10 which are positioned at the rising side of the wiper blade member 1, starting from the position P1 towards the position P2, the corresponding jets 11 of washing liquid being illustrated in FIG. 1 with lines which form a comb on the wiper blade member 1 and which emerge from the nozzles 10. This direction of movement is also illustrated by the arrow A in FIG. 1.

In this instance, the plurality of nozzles 10 is positioned at only one side of each wiper blade member 1 It is possible, but not obligatory, for the system to also comprise nozzles which are positioned in order to project the washing liquid towards the windscreen in front of the wiper blade member 1 when it returns from the end position P2 to the wiping starting position P1. The nozzle system 10 may be produced in several known manners. It may be constituted by a projection ramp which is produced separately from the wiper blade member 1 and which is connected thereto or fixedly joined to the connection mechanism. Alternatively, the nozzle system 10 may be formed by a conduit which is integrated in the wiper blade member 1 and which travels in the longitudinal direction thereof. Such a conduit may be formed, for example, in the air deflector.

The nozzles 10 are generally supplied from a reservoir 12 of washing liquid via conduits 13. In the example in question, a pump 14 which can be electronically controlled and which is placed on the conduits 13 enables the washing liquid to be projected from the nozzles 10 or enables this projection to be stopped.

The wiping and washing system according to the invention further comprises processing means, for example, an electronic casing 15 which is connected to the drive motor 9 of the arm(s) 7 and to the washing liquid pump 14. The electronic casing 15 may carry out a programme which controls the action of the motor 9 and the pump 14 and it is capable of making the wiping and washing system carry out cycles which will be described below.

First of all, it should be remembered that the wiping and washing system is generally capable of carrying out one or more successive wiping cycles without washing. With reference to FIG. 2, such a wiping cycle comprises two steps. In a first step, each wiper blade member 1 passes over the surface of the windscreen 2 in the direction of the arrows indicated in the portion a) of FIG. 2, moving from the wiping starting position P1 to the wiping end position P2, without any projection of washing liquid. In a second step, the wiper blade member 1 passes over the windscreen 2 in the opposite direction in accordance with the arrows indicated in part b) of FIG. 2, from the position P2 to the position P1, still without any projection of washing liquid. The wiping starting positions P1 and wiping end positions P2 therefore define for a wiping surface of the windscreen 2 for each wiper blade member 1 of the wiping and washing system.

Generally, it is possible to control the motor 9 in order to select between different travel speeds of the wiper blade member 1 during such a cycle.

According to a first embodiment of the invention, with reference to FIG. 3, the wiping and washing system is configured to implement a washing method whose steps are described below.

With reference to the diagram a) of FIG. 3, the method generally begins when the wiper blade members 1 are in the wiping starting position P1. This position P1 thus constitutes a first starting position P1 for the washing method.

The method preferably comprises a first wiping cycle from the first starting position P1, corresponding to a first and a second step of the method.

In a first step which is illustrated in the diagram b) of FIG. 3, each wiper blade member 1 wipes the windscreen 2 from the first starting position P1 to the wiping end position P2 and the nozzles 10 project jets 11 of washing liquid in front of each wiper blade member 1 during the entire travel. During this travel, the dust is at least partially diluted by the liquid then pushed in front of each wiper blade member 1 by the wiper blade.

In a second step which is illustrated in diagram c) of FIG. 3, each wiper blade member 1 wipes the windscreen 2 returning from the position P2 to the first starting position Pl. In this step, the projection of washing liquid by the nozzles 10 is preferably stopped. During this movement, a portion of the dust remaining on the windscreen 2 is pushed by each wiper blade member 1 to the first starting position P1 and forms a strip in this position P1. It is possible to note in this regard that the wiper blade member 1 on the right in the diagrams wipes the dust left by the wiper blade member 1 on the left into the wiping end position P2 thereof in the centre of the windscreen 2 in the previous step.

The method according to the invention then comprises a second wiping cycle, corresponding in this instance to a third and a fourth step of the method.

In a third step which is illustrated in the diagram d) of FIG. 3, each wiper blade 1 wipes the windscreen 2 from the first starting position P1 to the wiping end position P2 and preferably the nozzles 10 project jets 11 of washing liquid in front of each wiper blade member 1 during the entire travel. This step is generally substantially the same as the first step.

In a fourth step which is illustrated in the diagram e) of FIG. 3, each wiper blade member 1 wipes the windscreen 2 when returning from the position P2 to a position P3 which is located slightly in front of the first starting position P1 starting from the wiping starting position P2. The offset of P3 relative to P1 is defined in such a manner that the wiper blade of each wiper blade member 1 does not touch the zone where it has deposited dust, when the wiper blade member 1 is positioned in the first starting position P1, at the end of the second step. Typically, this position P3 corresponds to an offset θ1 of the rotation of the drive arm 7 of from two to three degrees upwards relative to the position P1, controlled by the drive motor 9. In this step, the projection of washing liquid by the nozzles 10 is preferably stopped.

The position P3 constitutes a second starting position for subsequent wiping operations of the windscreen 2 by each wiper blade member 1. During the movement of each wiper blade member 1 in this fourth step, a portion of the dust remaining on the windscreen 2 after the third step is pushed by each wiper blade member 1 to the second starting position P3. Moving in the opposite direction again, the wiper blade member 1 can carry a portion of the dust which is pushed by it and which forms a strip in the second starting position P3. However, after the second and third steps which comprise a projection of washing liquid, this strip of dust is substantially less significant than the strip of dust deposited in the first starting position P1. Each of the wiper blade members 1 therefore carries less dust which can be deposited on the windscreen 2 than if it was starting from the first starting position P1 again.

Preferably, such a washing method also comprises a third wiping cycle which corresponds to a fifth and a sixth step, In a fifth step which is illustrated in the diagram f) of FIG. 3, each wiper blade member 1 wipes the windscreen 2 from the second starting position P3 to the end position P2 and preferably the nozzles 10 project jets of washing liquid in front of each wiper blade member 1 during the entire travel. During this travel, the remaining dust is once again at least partially diluted by the liquid then pushed in front of each wiper blade member 1 by the wiper blade.

In a sixth step which is illustrated in the diagram g) of FIG. 3, each wiper blade member 1 wipes the windscreen 2 when returning from the position P2 to a position P4 which is located slightly in front of the second starting position P3 starting from P2. The offset of P4 relative to P3 is defined in such a manner that the wiper blade of each wiper blade member 1 does not touch the zone where it has deposited dust when the wiper blade member 1 is positioned in the second starting position P3 at the end of the fourth step. Typically, this position corresponds, as above, to an offset θ2 of the rotation of the drive arm 7 of from 2 to 3 degrees in an upward direction relative to the position P3, controlled by the drive motor 9. In this manner, the third starting position P4 substantially corresponds to an offset θ3 which is equal to the sum of the successive offsets θ1 and η2, of from four to seven degrees in the rotation of the drive arm 7 relative to the wiping starting position P1. In this step, the projection of washing liquid by the nozzles 10 is preferably stopped.

In a seventh step, the wiping and washing system preferably carries out a wiping cycle without actuation of the washing projection, similar to that described with reference to FIG. 2. However, in contrast to the wiping cycle which has been described above, each wiper blade member 1 begins this cycle starting from the second starting position P4, as illustrated in the diagram h) of FIG. 3 and returns, as illustrated in the diagram i) of FIG. 3, to the wiping starting position P1.

For the same reasons as those set out above, the fact that the third starting position P4 is offset relative to the second the starting position P3 results in the wiper blade member 1 depositing less remaining dust during the seventh step. The surface of the windscreen 2 is cleaned in an optimum manner after such a wiping cycle, in particular if a significant quantity of dust was deposited on the windscreen 2.

A second embodiment of such a washing method will now be described, with reference to FIG. 4, for a wiping and washing system which is arranged to be able to position each wiper blade member 1 in a parking position P0. In order to carry out the second embodiment of the method which will be described below, the starting position P1 of a wiping cycle of the wiping and washing system is offset towards the wiping end position P2 relative to the parking position P0 by a distance which is equivalent to that which separates the first starting position P1 and the third starting position P4 in the first embodiment of the washing method. In other words, this offset, which is illustrated in the portion a) of FIG. 4, corresponds substantially to a rotation angle θ3 of approximately from four to seven degrees to the end position P2 for the motor 9 and the drive arm 7, starting from the parking position P0 to the wiping starting position P1.

With reference to the diagram a) of FIG. 4, the method according to the second embodiment generally begins when the wiper blade members 1 are in the parking position P0. If the wiper blade members 1 are not in this position and are located, for example, in the first wiping starting position P1, the method comprises a preliminary step which installs each wiper blade member 1 in the parking position P0, so that P0 constitutes the first starting position of the second embodiment of the washing method.

Preferably, the second embodiment of the method further comprises a first wiping cycle from the first starting position P1, which corresponds to first and second steps which are illustrated in the diagrams b) and c) of FIG. 4, which are carried out under the same conditions as the first and second steps of the first embodiment with, for the first starting position, the parking position P0.

The second embodiment of the method then comprises a second wiping cycle which corresponds in this instance to a third and fourth step of the method.

In the third step which is illustrated in the diagram d) of FIG. 4, which is similar to the third step of the first embodiment, each wiper blade member 1 wipes the windscreen 2 from the first starting position P0 of the first variant of the cycle to the end position P2 and in which, preferably, the nozzles 10 project jets 11 of washing liquid in front of each wiper blade member 1 during the entire travel.

The fourth step of the second embodiment which is illustrated in the diagram e) of FIG. 4 is also similar to the fourth step of the first embodiment, preferably without any projection of washing liquid. In this instance, each wiper blade member 1 wipes the windscreen 2 returning from the position P2 to a position P5 which is located slightly in front of the parking position P0 starting from the end position P2. The offset of P5 relative to P0 is defined in the same manner as that between the second starting position P3 and first starting position P1 of the first variant. Typically, this position corresponds to an offset θ1 of the rotation of the drive arm 7 of from two to three degrees in an upward direction relative to the position P0. This offset therefore has the same effects as the offset introduced in the first variant on the driving of the dust by the wiper blade of the wiper blade member 1 when it then moves again towards the wiping end position P2.

It should also be noted that the offset θ2 between the second starting position P5 of this embodiment and the wiping starting position P1 which is equal to the difference between the offsets θ3 and θ1 is substantially the same as that between the second starting position P3 and the third starting position P4 in the first embodiment.

Preferably, this second variant also comprises a third wiping cycle which corresponds to fifth and sixth steps and which is carried out under the same conditions as those described for the first embodiment but using different starting positions.

In a fifth step which is illustrated in the diagram f) of FIG. 4, the wiper blade members 1 rise in this instance from the second starting position P5 of this cycle to the end position P2.

In a sixth step, which is illustrated in the diagram g) of FIG. 4, the wiper blade members 1 start again from the end position P2 and stop at the wiping starting position P1 which is equivalent in this instance to the third starting position P4 of the preceding variant and has an offset θ2 with the second starting position P5.

Finally, the second embodiment preferably comprises a seventh step in which the wiping and washing system carries out a washing cycle without actuation of the washing projection and which is similar to that described with reference to FIG. 2.

In this second embodiment, two options are possible. In a first option, in contrast to the preceding variant, the wiping cycle of the seventh step is carried out normally starting from the wiping starting position P1 as illustrated in the diagram h) of FIG. 4, and each wiper blade member 1 returns to the wiping starting position P1, as illustrated in the diagram i) of FIG. 4. The wiping and washing system is thus ready to carry out wiping cycles, for example, in the event of rain. With this option, the second variant has the advantage that the wiper blade of each wiper blade member 1 never returns to the strips of dust which are deposited at the first starting positions P0, P5 of the wiping cycles at which the means for projecting washing liquid have been able to be actuated In a second option, if the wiping and washing system does not have to be used immediately after the implementation of the washing method, for example, in the event of parking, the wiping cycle can be followed by a movement of each wiper blade member 1 to the parking position P0.

The invention claimed is:

1. A method for washing a window of a vehicle, using at least one wiper blade member and a liquid projector that projects liquid for washing the window onto a wiping surface, comprising:
    a first wiping cycle, comprising:
        a first step of actuating the wiper blade member to move over the window in a first direction from a first starting position to a wiping end position, while projecting the liquid onto the wiping surface, and
        a second step of actuating the wiper blade member to move over the window in a second direction opposite the first direction from the wiping end position the first starting position;
    a second wiping cycle, comprising:
        a third step of actuating the wiper blade member to move over the window in the first direction from the first starting position to the wiping end position, while projecting the liquid onto the wiping surface, and
        a fourth step of actuating the wiper blade member to move over the window in the second direction from the wiping end position to a second starting position; and
    a third wiping cycle, comprising:
        a fifth step of actuating the wiper blade member to move over the window in the first direction from the second starting position to the wiping end position, while projecting the liquid onto the wiping surface, and
        a sixth step of actuating the wiper blade member to move over the window in the second direction from the wiping end position to a third starting position, the second starting position, or the first starting position,
    wherein the first starting position is farther away from the wiping end position than the second starting position, and
    wherein the second starting position is farther away from the wiping end position than the third starting position.

2. The method according to claim 1, wherein the first starting position and second starting position are located in a predetermined zone that minimises a spread of dust over the wiping surface outside the predetermined zone.

3. The method according to claim 1, wherein, in the third step or the fifth step, the liquid projector is actuated to project washing liquid in front of the wiper blade member relative to the first direction.

4. The method according to claim 1, comprising a fourth wiping cycle comprising:
    a seventh step of actuating the wiper blade member to move over the window in the first direction from the third starting position, the second starting position, or the first starting position to the wiping end position, without projecting the liquid onto the wiping surface, and
    an eighth step of actuating the wiper blade member to move over the window in the second direction from the wiping end position to the third starting position, the second starting position, or the first starting position, without projecting the liquid onto the wiping surface.

5. The method according to claim 1, wherein the first starting position of the first wiping cycle which is carried out is substantially the same as a wiping starting position.

6. The method according to claim 1, wherein the first starting position is a parking position which is further away from the wiping end position than a wiping starting position.

7. The method according to claim 1, wherein the second step, the fourth step, and the sixth step are carried out without actuating the liquid projector.

8. The method according to claim 1, wherein the wiper blade member moves over the window upwards during the first step, the third step, and the fifth step.

9. A control device for a system for wiping and washing a window of a vehicle comprising a wiper blade member, an actuator that actuates the wiper blade member, and a liquid projector that projects a liquid for washing the window, the device comprising:
    an electronic member programmed to actuate the actuator of the wiper blade member and the liquid projector to perform:
        a first wiping cycle, comprising:
            a first step of actuating the wiper blade member to move over the window in a first direction from a first starting position to a wiping end position, while projecting the liquid onto the wiping surface, and
            a second step of actuating the wiper blade member to move over the window in a second direction opposite the first direction from the wiping end position to the first starting position;
        a second wiping cycle, comprising:
            a third step of actuating the wiper blade member to move over the window in the first direction from the first starting position to the wiping end position, while projecting the liquid onto the wiping surface, and a fourth step of actuating the wiper blade member to move over the window in the second direction from the wiping end position to a second starting position; and a third wiping cycle, comprising:

a fifth step of actuating the wiper blade member to move over the window in the first direction from the second starting position to the wiping end position, while projecting the liquid onto the wiping surface, and a sixth step of actuating the wiper blade member to move over the window in the second direction from the wiping end position to a third starting position, the second starting position, or the first starting position, wherein the first starting position is farther away from the wiping end position than the second starting position, and wherein the second starting position is farther away from the wiping end position than the third starting position.

10. A system for wiping and washing a window of a vehicle, the system comprising:

a wiper blade member;

an actuator that actuates the wiper blade member which are arranged so that the wiper blade member moves over the window;

a liquid projector that projects a liquid for washing the window configured to project the washing liquid in front of the wiper blade member; and a control device, comprising an electronic member programmed to actuate the actuator of the wiper blade member and the liquid projector to perform:

a first wiping cycle, comprising:

a first step of actuating the wiper blade member to move over the window in a first direction from a first starting position to a wiping end position, while projecting the liquid onto the wiping surface, and a second step of actuating the wiper blade member to move over the window in a second direction opposite the first direction from the wiping end position to the first starting position;

a second wiping cycle, comprising:

a third step of actuating the wiper blade member to move over the window in the first direction from the first starting position to the wiping end position, while projecting the liquid onto the wiping surface, and a fourth step of actuating the wiper blade member to move over the window in the second direction from the wiping end position to a second starting position; and a third wiping cycle, comprising:

a fifth step of actuating the wiper blade member to move over the window in the first direction from the second starting position to the wiping end position, while projecting the liquid onto the wiping surface, and a sixth step of actuating the wiper blade member to move over the window in the second direction from the wiping end position to a third starting position, the second starting position, or the first starting position, wherein the first starting position is farther away from the wiping end position than the second starting position, and wherein the second starting position is farther away from the wiping end position than the third starting position.

11. The system according to claim 10, wherein the actuator comprises a motor which can be ontrolled electronically and an arm for driving the wiper blade member, the motor rotatably driving the drive arm.

12. The system according to claim 11, arranged so that the offset between the second starting position and the first starting position, corresponds to an angular difference which is greater than or equal to two degrees in the rotation of the drive arm.

13. The system according to claim 10, configured so that a wiping starting position is lower than relative to the wiping end position.

14. The system according to claim 10, configured to carry out wiping cycles in which the wiper blade member carries out a back and forth movement between a wiping starting position and the wiping end position without the liquid projector being actuated, and arranged so that the wiper blade member is positioned in a parking position, when not used, which is further away from the wiping end position than the wiping starting position.

* * * * *